(12) United States Patent
Bosse

(10) Patent No.: US 12,505,631 B2
(45) Date of Patent: Dec. 23, 2025

(54) DYNAMIC DIGITAL AVATAR FOR REAL-TIME ENGAGEMENT

(71) Applicant: MAK Technologies, Inc., Orlando, FL (US)

(72) Inventor: Mike Bosse, Orlando, FL (US)

(73) Assignee: MAK TECHNOLOGIES, INC., Orlando, FL (US)

( * ) Notice: Subject to any disclaimer, the term of this patent is extended or adjusted under 35 U.S.C. 154(b) by 0 days.

(21) Appl. No.: 19/044,263

(22) Filed: Feb. 3, 2025

(65) Prior Publication Data

US 2025/0252680 A1  Aug. 7, 2025

Related U.S. Application Data

(60) Provisional application No. 63/548,706, filed on Feb. 1, 2024.

(51) Int. Cl.
*G06T 19/00* (2011.01)
*G06T 13/40* (2011.01)

(52) U.S. Cl.
CPC ............ *G06T 19/006* (2013.01); *G06T 13/40* (2013.01)

(58) Field of Classification Search
None
See application file for complete search history.

(56) References Cited

U.S. PATENT DOCUMENTS

| | | |
|---|---|---|
| 10,930,044 B2 | 2/2021 | Zelenin et al. |
| 11,699,269 B2 | 7/2023 | Bryant et al. |
| 2016/0335808 A1* | 11/2016 | Novak ............... G06F 3/011 |
| 2019/0122411 A1* | 4/2019 | Sachs ................. G06T 7/90 |
| 2020/0019242 A1 | 1/2020 | Atlas et al. |
| 2022/0165013 A1 | 5/2022 | Velez et al. |
| 2023/0122450 A1 | 4/2023 | Oiwal et al. |
| 2023/0128422 A1 | 4/2023 | Li et al. |
| 2023/0401795 A1 | 12/2023 | Streja et al. |

\* cited by examiner

*Primary Examiner* — Nicholas R Wilson
(74) *Attorney, Agent, or Firm* — SQUIRE PATTON BOGGS (US) LLP

(57) ABSTRACT

Systems, methods, apparatuses, and computer program products for a shared preamble set for human-computer interactions and dynamic avatar. A method may include receiving an input from a real world environment. The method may also include integrating the input into a virtual world environment. The method may further include generating an output based on the integration of the input into the virtual environment. The output may include data or discrete events that represent information about the real world environment or the virtual world environment. The method may also include displaying the output via display device, and receiving interactive data in response to an interaction with the output.

18 Claims, 8 Drawing Sheets

DYNAMIC DIGITAL AVATAR FOR REAL-TIME ENGAGEMENT

CROSS-REFERENCE TO RELATED APPLICATIONS

This application claims priority from U.S. provisional patent application No. 63/548,706 filed on Feb. 1, 2024. The contents of this earlier filed application are hereby incorporated by reference in their entirety.

FIELD

Some example embodiments may generally relate to technologies to integrate different technologies to elevate virtual avatar interactions. More specifically, certain example embodiments may relate to a device, method, and/or system for human-computer interactions and a dynamic avatar.

BACKGROUND

As technological progress accelerates, the demand for enhanced and intuitive digital interactions continues to grow. One solution gaining substantial attention is the evolution of virtual avatars. These lifelike digital representations of humans, capable of realistically responding to user input, promise a new level of interactivity. While some of these virtual avatars can mimic human expressions or reactions randomly, these are typically not as a real-time response to a specific human interaction. In some cases, the responses from these avatars may be robotic and devoid of appropriate human gestures or expressions.

The advent of powerful Artificial Intelligence (AI) technologies has revolutionized how we engage with digital systems. Speech recognition allows users to interact solely through voice, while speech synthesis enables devices to audibly respond. Large language models such as GPT-3 generate human-like text, while computer vision empowers virtual avatars to detect, recognize, and interpret real-world environments visually. Robotics use AI to develop and design robots or machines capable of performing tasks autonomously or semi-autonomously. Computer vision enables AI algorithms to accurately and reliably identify objects that the machine "sees" and react accordingly. With the developments of intuitive digital interactions and AI technologies, there is a need to provide a system that has the capability of integrating state-of-the-art technologies such as speech recognition, speech synthesis, large language models, and computer vision, detection and recognition, and augmented reality to elevate virtual avatar interactions to unprecedented levels of realism. There is also a need to provide a system to work synergistically, allowing these and other AI components to provide a level of realism and interaction with a digital avatar that is indistinguishable from an interaction between two or more humans.

SUMMARY

Some example embodiments may be directed to a method. The method may include receiving an input from a real world environment. The method may also include receiving an input from a real world environment. The method may also include integrating the input into a virtual world environment. The method may further include generating an output based on the integration of the input into the virtual environment. According to certain embodiments, the output may include data or discrete events that represent information about the real world environment or the virtual world environment. In addition, the method may include displaying the output via display device. Further, the method may include receiving interactive data in response to an interaction with the output.

Other example embodiments may be directed to an apparatus. The apparatus may include at least one processor and at least one memory including computer program code which, when executed by the at least one processor, cause the apparatus to at least receive an input from a real world environment. The apparatus may also be caused to integrate the input into a virtual world environment. The apparatus may further be caused to generate an output based on the integration of the input into the virtual environment. According to certain embodiments, the output may include data or discrete events that represent information about the real world environment or the virtual world environment. In addition, the apparatus may be caused to display the output via display device. Further, the apparatus may be caused to receive interactive data in response to an interaction with the output.

Other example embodiments may be directed to an apparatus. The apparatus may include means for receiving an input from a real world environment. The apparatus may also include means for integrating the input into a virtual world environment. The apparatus may further include means for generating an output based on the integration of the input into the virtual environment. In certain embodiments, the output may include data or discrete events that represent information about the real world environment or the virtual world environment. In addition, the apparatus may include means for displaying the output via display device. Further, the apparatus may include means for receiving interactive data in response to an interaction with the output.

In accordance with other example embodiments, a non-transitory computer readable medium may be encoded with instructions that may, when executed in hardware, perform a method. The method may include receiving an input from a real world environment. The method may also include receiving an input from a real world environment. The method may also include integrating the input into a virtual world environment. The method may further include generating an output based on the integration of the input into the virtual environment. According to certain embodiments, the output may include data or discrete events that represent information about the real world environment or the virtual world environment. In addition, the method may include displaying the output via display device. Further, the method may include receiving interactive data in response to an interaction with the output.

Other example embodiments may be directed to a computer program product that performs a method. The method may include receiving an input from a real world environment. The method may also include receiving an input from a real world environment. The method may also include integrating the input into a virtual world environment. The method may further include generating an output based on the integration of the input into the virtual environment. According to certain embodiments, the output may include data or discrete events that represent information about the real world environment or the virtual world environment. In addition, the method may include displaying the output via display device. Further, the method may include receiving interactive data in response to an interaction with the output.

Other example embodiments may be directed to an apparatus that may include circuitry configured to receive an input from a real world environment. The apparatus may also include circuitry configured to integrate the input into a virtual world environment. The apparatus may further include circuitry configured to generate an output based on the integration of the input into the virtual environment. According to certain embodiments, the output may include data or discrete events that represent information about the real world environment or the virtual world environment. In addition, the apparatus may include circuitry configured to display the output via display device. Further, the apparatus may include circuitry configured to receive interactive data in response to an interaction with the output.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Figure 1:
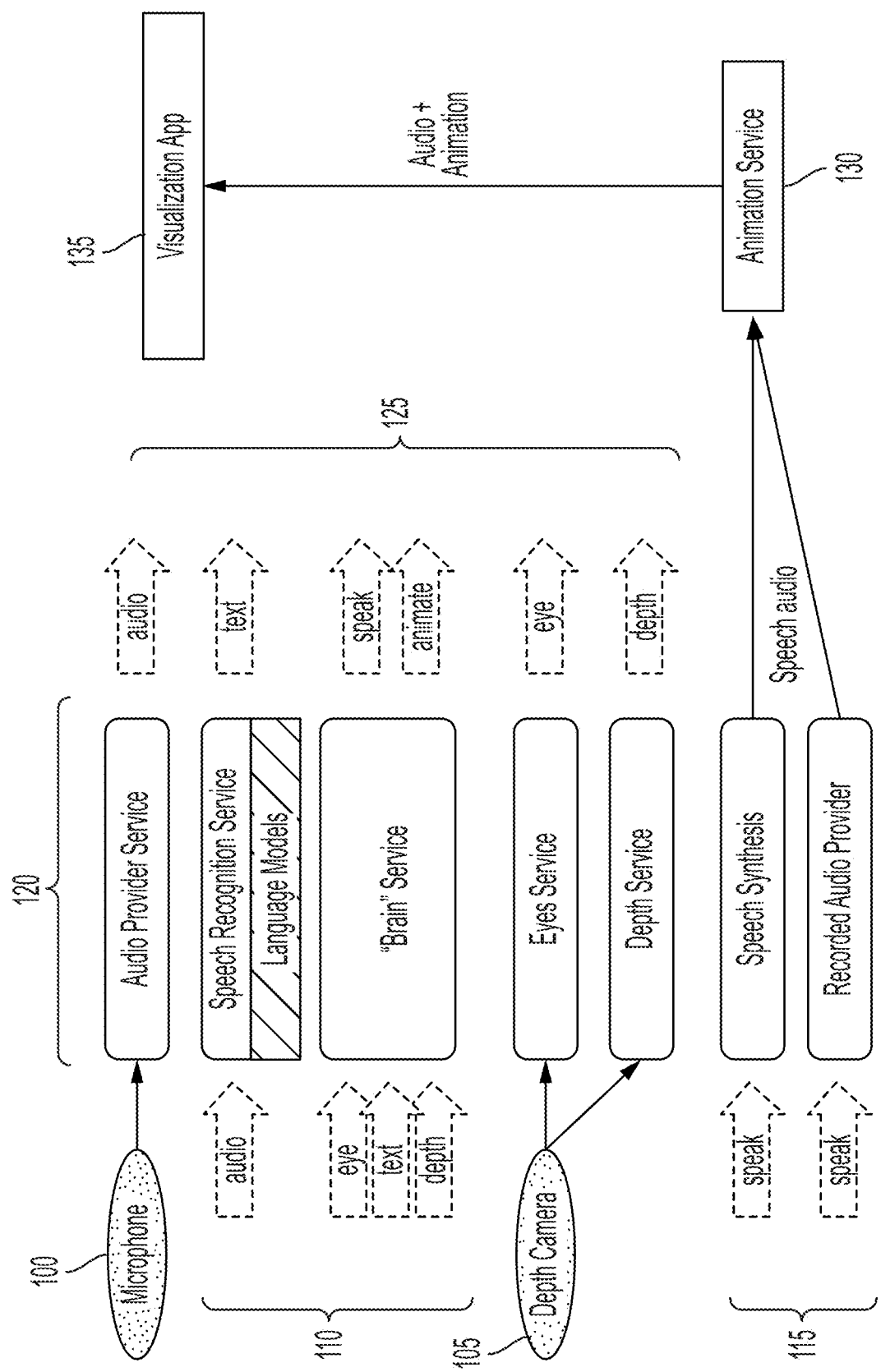
FIG. 1 illustrates an example dynamic avatar architecture, according to certain embodiments.

It will be readily understood that the components of certain example embodiments, as generally described and illustrated in the figures herein, may be arranged and designed in a wide variety of different configurations. The following is a detailed description of some embodiments of systems, methods, apparatuses, and/or computer program products for human-computer interactions and dynamic avatars.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain embodiments may provide a system that is capable of integrating artificial intelligence (AI) components (e.g., speech recognition, speech synthesis, language models, computer vision, robotics, etc.) into a framework that may be used to create an engaging and intuitive virtual avatar that receives inputs from multiple sources, reacting in real time to stimulus from multiple environments. The environments may include, for example, reality, virtual/digital environments, or a hybrid of the real world environment and the virtual/digital world environment, providing responses to a user, which are imperceptible from those that would be received by a human respondent. In some embodiments, these AI components may be expertly architected with additional technology to work synergistically, and provide a level of realism and avatar interaction unparalleled in the industry. In certain embodiments, the system may be used at least in, for example, any use case that requires human interaction, human instruction, human guidance, or other human interaction. Examples of such use cases may include the oil and gas industry, the Department of Defense, the Department of Homeland Security, aerospace, automotive, retail, education, hospitality, medical, dental, museums, entertainment, sports, facility reception desks or security, memorials, tombstones, transportation, airport (e.g., security, lounges, ticketing and check-ins, information kiosks, etc.), self-service kiosks, banking and finance (e.g., customer service, virtual teller, and/or smart ATMS, etc.), vehicle rental agencies, and others.

FIG. 1 illustrates an example dynamic avatar architecture, according to certain embodiments. As illustrated in FIG. 1, each component may be configured to deliver optimal performance in its respective area. FIG. 1 illustrates a virtual avatar architecture that may implement advanced algorithms to accurately transcribe user input into text, and enable virtual avatars to understand and interpret nuances of human speech patterns. For instance in some embodiments, the human speech patterns may include accents, dialects, and variations in tone and inflection.

As illustrated in FIG. 1, the architecture may include one or more input devices such as, for example, a microphone 100 and a depth camera 105. In certain embodiments, the depth camera 105 may use offset cameras to provide two video streams of a given area, one including the color information, and the another camera providing the depth information (e.g., derived distances from the camera along a ray). In other embodiments, the depth camera 105 may serve as a sensor that may fuse output streams of various sources and senses. In further embodiments, the depth camera 105 may be a high resolution video source with two or more streams on which image processing may be performed.

As illustrated in FIG. 1, the architecture may include other input sources such as, for example, input from audio, eyes of a subject, text, and depth of an object 110. The elements in the diagram represented as eyes, text, and depth are messages within the system. That said, the data within each are roughly as follows. The eyes message provides a list of people and objects of interest as seen by cameras in the playing area. This can include people, their pose and location information, weapons, or any other visible elements of interest. The text message provides the transcribed spoken text as processed by a speech to text module. This may include the actual text, duration of the speech, and the detected language. The depth message provides additional information regarding the location of items within the playing area including the distance to the camera. Input may also include spoken words 115.

As illustrated in FIG. 1, the input 110, 115 and input captured via the microphone 100 and depth camera 105 may be received at corresponding services 120. The Audio Provider service can capture audio streams from microphones on devices within the playing area. This audio is streamed into the system for processing by other interested services. The Speech Recognition service can encapsulate a Speech to Text model that processes audio streams into strings of text. The Speech Recognition service can subscribe to audio streams provided by the Audio Provider services and processes them. When a detection is made, the time, text, and language information may be relayed to the other services using the Text message. The Eyes service can provide optical recognition services for cameras within the system. This may include running several computer vision algorithms that detect the presence of people and items of interest within the view of each camera. These items may be characterized and published to the network using the Eye message. People may be located within the view and their pose can be estimated using a combination of the output of the eye service and the depth service messages. These messages may include the location, type, and position of items and people of interest within the view of the system. The Speech Provider service can encapsulate a text to speech library which transforms speak messages into audio streams for playback to the user. The Recorded Audio Provider service can provide a catalog of pre-recorded audio segments for playback on command. Each audio file may be stored with the voice name and text associated with it and when a matching speak message is ingested the correlated prerecorded audio file is streamed to the network. The speak message may include the text to be spoken, the language, and the voice model to use. The brain service may be the central control of the system. The brain service can monitor input messages and use its internal rules engine, fact system, semantic mapping, and other components to determine the appropriate actions for the modeled virtual human.

According to certain embodiments, the services 120 may include an audio provider service, speech recognition service, language models, "brain" service, eye service, depth service, speech synthesis, and recorded audio provider. Once the services 120 receive the input from the microphone 100, input 110, depth camera 105, and input 115, the services 120 may process the input to create output 125. Moreover, the speech synthesis and recorded audio provider of the services 120 may process the spoken input 115 as speech audio, and provide the speech audio to an animation service 130. The animation service 130 may process the received speech audio by adding animation to the speech audio, and transmitting the audio and animation combination to a visualization application 135. The animation service may be responsible for mapping spoken speech and other inputs of interest from the brain and speech systems into animation data to be consumed and played by the visualization application. This may include lip synching audio and bodily animations both in response to text and at any time deemed appropriate by the brain. The visualization application may be responsible for presentation of the virtual human to the user. Additionally, the visualization application can draw a virtual environment and the virtual human within that environment. The visualization application can also supply visual and audio cues on command from the brain and spontaneously depending on how it is configured.

According to certain embodiments, in speech synthesis, high-fidelity text-to-speech capabilities may accurately replicate the rhythm, intonation, and cadence of human speech, enhancing the lifelike experience enabling our virtual avatars to respond with realistic speech patterns that are indistinguishable from those of a human speaker. This may include hundreds of languages and multi-lingual translations. Avatar visualizations may be powered by utilizing a machine learning library to generate facial animations from either pre-recorded audio or synthetic audio.

According to other embodiments, large language models may utilize powerful AI technologies such as offline secure versions GPT-3 and BERT. For instance, the system may generate highly detailed, coherent, context-specific text-based responses to user input allowing virtual avatars to respond with nuanced and sophisticated answers that are tailored to the specific context of the conversation.

Figure 2:
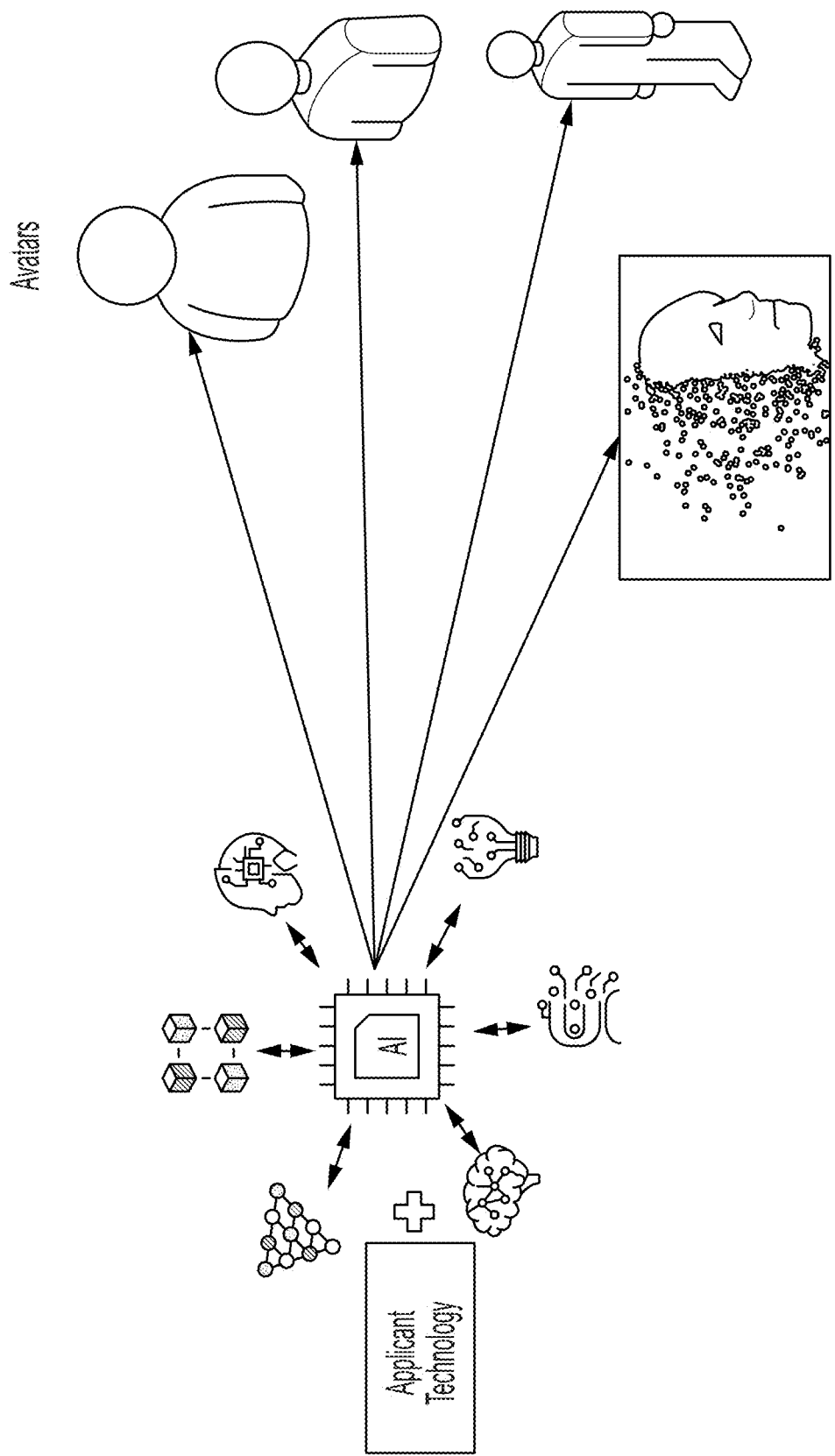
FIG. 2 an example of an implementation with various artificial intelligence (AI) components to generate avatars and digital human representations, according to certain embodiments.

FIG. 2 illustrates an example of an implementation with various AI components to generate avatars and digital human representations, according to certain embodiments. According to certain embodiments, AI components/types, including ML, natural language processing, computer vision, deep learning, generative models, other AI types, and combinations of the foregoing, may be integrated with hardware and software to implement the virtual avatar discussed above.

Figure 3:
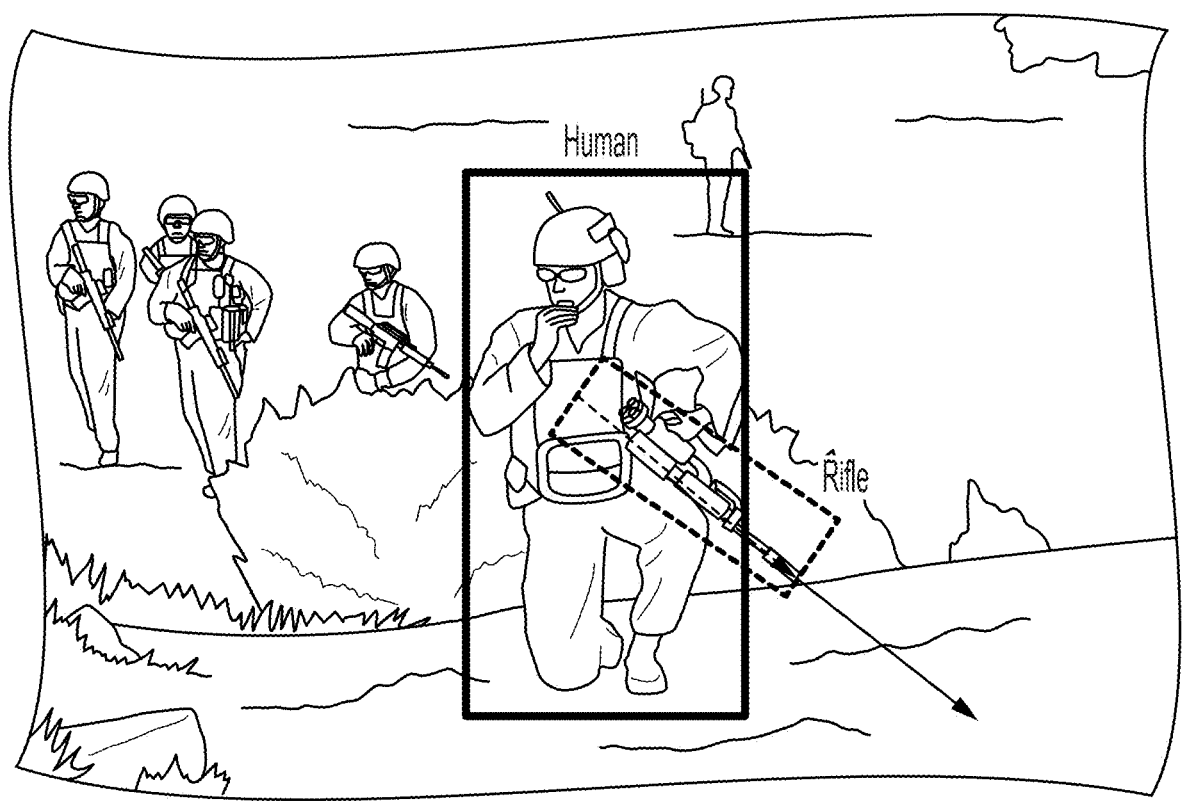
FIG. 3 illustrates an example computer vision implementation, according to certain embodiments.

FIG. 3 illustrates an example computer vision implementation, according to certain embodiments. According to certain embodiments, computer vision, detection, and recognition may be provide algorithms with capabilities to interpret real-world environments, determine the presence and orientation of small arms weapons, tooling, and other objects. This combination of techniques may allow virtual avatars to interact realistically with physical spaces providing the user with a more immersive experience.

Figure 4:
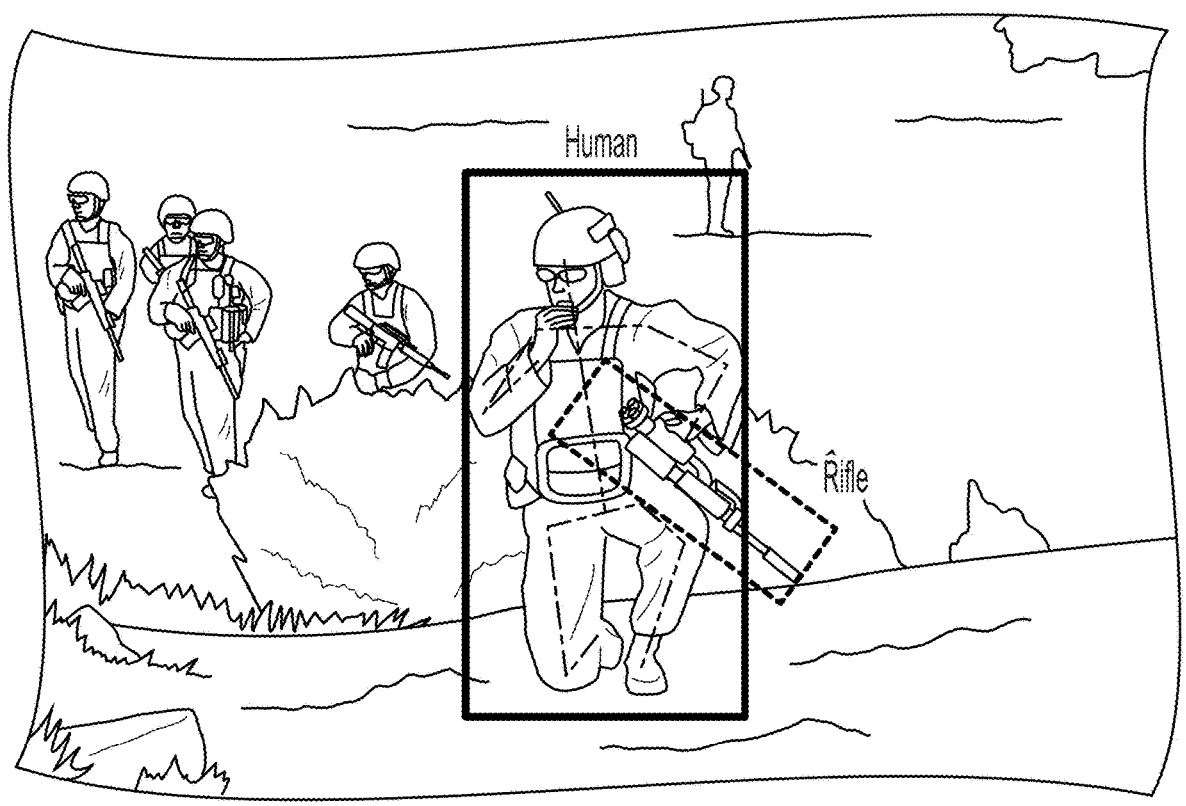
FIG. 4 illustrates an example spatial awareness implementation, according to certain embodiments.

FIG. 4 illustrates an example spatial awareness implementation, according to certain embodiments. According to certain embodiments, in computer vision implementations, certain algorithms may accurately detect and recognize human and pet life forms, and attributes in space such as distance, posture, and individual body part locations (i.e., hands raised, hands by sides, hands balled into fists, etc.).

Figures 5A, 5B, 5C:
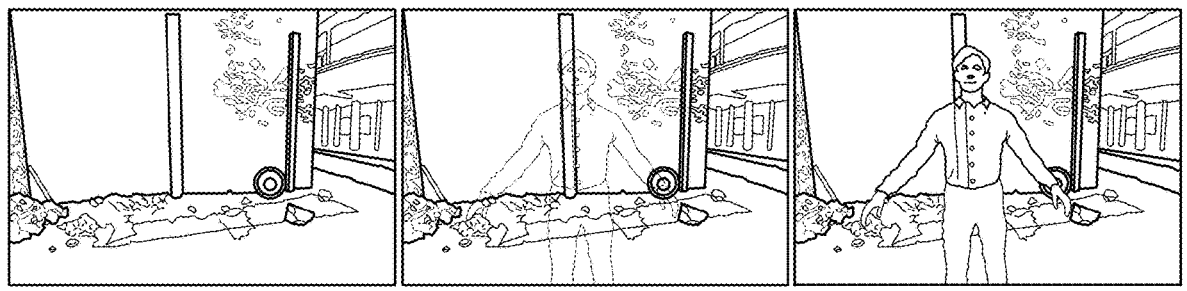
FIG. 5A illustrates an example of augmented reality, according to certain embodiments.
FIG. 5B illustrates an example of another augmented reality, according to certain embodiments.
FIG. 5C illustrates an example of a further augmented reality, according to certain embodiments.

FIGS. 5A-5C illustrate an example of augmented reality, according to certain embodiments. As illustrated in FIGS. 5A-5C, the visualization component, may be adaptable to various forms, which brings the virtual world into the real world. The system of certain embodiments may use an augmented reality device, solving the occlusion problem with segmented dimming utilizing an occlusive layer in the display device to block light from the environment displaying opaque virtual entities.

Figure 6:
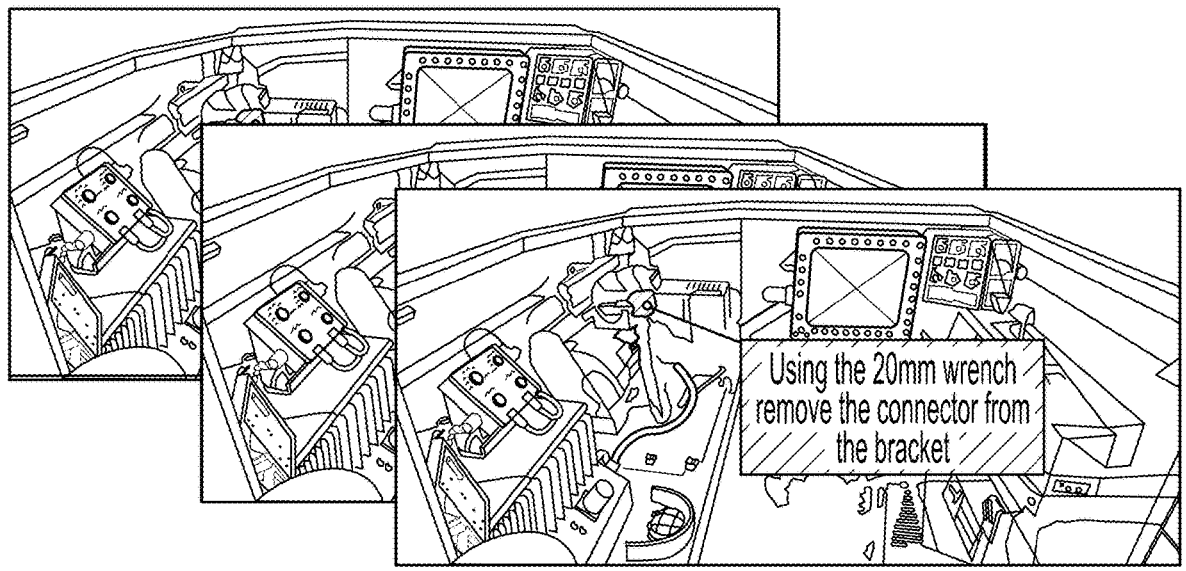
FIG. 6 illustrates an example 3D visualization of a training environment, according to certain embodiments.

FIG. 6 illustrates an example of a 3D visualization of a training environment, according to certain embodiments. As illustrated in FIG. 6, the system of certain embodiments may be capable of displaying virtual text and/or images that are overlayed within the real world environment. The system can perform an overlay function in a mixed reality application. The environment has a physical or virtual connector present in it. The system can also identify that connector and can highlight it by drawing over it in the view screen and adding augmentation of voice and/or text feedback to guide a user through a maintenance step.

The system of certain embodiments may include AI components that work together to simulate a lifelike and responsive digital avatar. For instance, in some embodiments, the AI components may including one or more external sources, sensors, actuators, and brains. In some embodiments, the components of the system may optionally be composable. To be composable in this case means that aggregations of systems can form to build more complex systems. For instance, in one example embodiment, the eyes service may provide 2D information about objects in the scene but it cannot determine how far away those items are. The depth service can use a depth camera to determine the distance to specific points on an image. A composed system could be made, called Gun Detector, that consists of an eye service, to locate guns and people, and a depth service, to determine the distance from the camera to a specific person and gun. The function of this system may be to determine if there are people in the scene and if those people are holding guns, and then what direction the people and the guns are facing. The resulting output of this component may therefore be an aggregation of the functionality of two other services.

A sensor can be composed of one or more input sources and sensors in a specific configuration to provide a desired output. The function of a sensor is to perform analysis on data derived from multiple sources, sensors, or brains and to supply the results of that analysis to the system. The individual components of such a sensor may retain their original designations but the derived combination in composition may become a sensor. The output of a sensor may be one or more streams of data or discrete events that represent information about the real or virtual world. An example of a sensor may include a depth camera which uses offset cameras to provide two video streams of a given area one including the color information and another the depth information (derived distances from the camera along a ray). The output of a sensor may be one or more streams of data or discrete events that represent information about the real or virtual world.

In certain embodiments, sources may include components that bring data from the real or virtual world across the system boundary and into the cognitive sphere of the system. Sources include items such as, for example, microphones, accelerometers, and cameras. According to certain embodiments, the purposes of a source may be to move data from either the real or virtual environment across the system boundary for processing by sensors and other system components. The data outputs may include streams of video frames, streams of audio, and streams of position and acceleration data.

According to certain embodiments, the sensors may include components that build new data that is derived from other sensors and sources within the system. The output of a sensor may include one or more streams of data or discrete events that provide a representation of events in the real or virtual world. An example of a sensor may include a human pose detector which fuses the output streams of various sources and senses such as a depth camera source, and a human presence detector sensor to produce an output data stream indicating the position of the limbs of an individual human within a blended real/virtual environment. An example of data fusion may include the combination of position data derived from a depth camera and eyes service that determines the position of a person in the virtual environment and the position data derived from a virtual reality headset to compose an operating picture of the position of all humans, both real and virtual in the combined real and virtual environment as an output to the rest of the system.

In certain embodiments, actuators may include components that provide the inverse function of a source. For example, the actuators may transform one or more data streams or discrete events across the system boundary into the real or virtual world. According to certain embodiments, the actuator may correspond to a component of the system that takes discrete events and data stream inputs, and produces the same. An example of an actuator may include a text to speech actuator which transforms a series of text data and emotional data generated by another component in the system into an audio stream that is played along with the corresponding animations on a virtual avatar. The input may include a discrete event such as, for example, a "talk" message, and the output may be an audio stream. The output of an actuator may also include a change or series of changes in the real or virtual world.

According to certain embodiments, the brains (e.g., "brain" service illustrated in FIG. 1) may correspond to a software component of the system that performs reasoning, and may include components that transform data streams and/or discrete events from sensors and sources into data streams or discrete events for consumption by actuators and sensors. As previously described, the actuator components may be generic processing units that take in any defined event or data stream in the system, and produces new data streams or events. In some cases, an actuator may act as a filter and only pass on certain events that it receives. For example, in a mathematical sense, an actuator may represent a function F that is defined as $x, y, z, \ldots = F(a, b, c, \ldots)$, where x, y, z, a, b, and c are a mix of streams or events. F transforms the inputs $(a, b, c, \ldots)$ into a series of outputs x, y, z to accomplish a particular function (e.g., non-mathematical sense of the word) of the system.

According to some embodiments, the brain components may be able to implement the cognition or reasoning capability in the system. In certain embodiments, the cognition or reasoning capability may be powered by three discrete systems including, for example, a rules based system, a mode where a large language model is provided, and a mode that includes a combination of the others where interactions are first checked against the scripted engine. According to certain embodiments, in the rules base system, text and events may be compared fuzzily with a "script" that controls how the virtual actor responds. In the mode where a large language model is provided, the large language model is provided with a body of information and the large language model is enabled to interpret the input of a user and generate output. In the mode where the interactions are first checked, the interactions are first checked against the scripted engine and then routed to a dedicated large language model that can perform ad-hoc interpretation and inference based on a personality description and previous interaction context, or draw upon the resources of the other large language model to provide specific data from its data store.

An example the brain's implementation may include the brain transforming a series of text messages into corresponding speech messages to simulate a conversation with the user. The spoken speech of the user is a stream of data that is converted into text messages that are processed by the brain and result in a speech message. The result of the speech message is to cause an audio stream to be played back to the user. According to certain embodiments, multiple brains can exist within the system at once and work together to process the vision of reality provided by sources and sensors into effects in the real world. The output of a brain may include a series of data streams and discrete events intended to represent the results of cognitive processing by a virtual avatar. Examples of brains may include a rules based scripting system to assist a user in finding a bathroom at a theme park or a large language model based character role player that provides a lifelike target for police training. Another example may involve a theme park scenario where a theme park greeter brain may be implemented as follows:

If there is a person in front of me, and I haven't greeted them—issue a greeting;
If I am asked where the bathrooms are—reply with directions;
If I am asked . . . —reply with . . .
If I see the person turn away—issue a goodbye;
If there is no person in front of me—reset the interaction.

Each of the above actions following a dash may correspond to a message or discrete event that may go into the system to accomplish something. Issuing a greeting may imply a "talk" message that may be processed by the tts to generate an audio greeting message. Furthermore, each action before the "—" may be a condition that is waiting on an input or series of inputs from other components of the system (e.g., the "if there is a person in front of me" would be a message received from the eyes service stating that there is a person in the play area).

In certain embodiments, the components within the system may be loosely coupled and entirely divorced from the underlying physical compute architecture. For instance, in some embodiments, the system may require more than one computer to represent a single virtual actor, or a single computer may be running multiple (e.g., hundreds or thousands) actors. In some embodiments, the system may be designed to work across platforms (e.g., hardware and software platforms, Linux, Windows, mobile, android, desktop, etc.), and may facilitate performing computation at the point of convenience (e.g., ability to interact with the system wherever is convenient since the system can operate on various types of hardware). For instance, considering the depth camera sensor as an example, the depth camera source may be a high resolution video source with two or more streams on which image processing must be performed. In order to minimize network bandwidth, the associated sensors may be placed physically close to the depth camera sensor to perform their analysis. For instance, it may be possible to reduce the bandwidth from a sensor on the outside of the system boundary by reducing the bandwidth to only the elements that are of interest and transmitting those into the system. In such a case the bandwidth consumption of the system may be reduced by converting two high resolution video streams into a series of points representing the poses and positions of objects in the field of regard of the source. The specifics of which objects are detected and have information derived and published for them can be made autonomously by the sensor or be guided by the output of a brain. As an example of this capability, when replicating the sleeping state of a virtual avatar, the specific object detection for the associated cameras may be turned off and instead a light level data may be requested by the brain. For instance, in certain embodiments, if the virtual avatar is sleeping, the object detection algorithms may be disabled since the virtual character has closed its eyes, and instead a hypothetical light level sensor (giving the amount of light in the room in a unit (e.g., Lux)) may be used to determine if the lights in the room are turned on.

According to certain embodiments, there may be several non-limiting examples of the system, and its function in real-world applications, including maintenance training, customs and border patrol, and police/military training, that enhance user experiences, streamline processes, and foster meaningful human interactions.

Maintenance Training and Operations

The system of certain embodiments, combined with a mixed-reality headset, may provide maintenance training, seamlessly transitioning from a classroom to real-world applications. A three-dimensional representation of the work environment is displayed, incorporating text, speech, and visual cues comparable to computer based training (CBT) systems. In certain embodiments, virtual avatars may be provided to present training data, address student questions, and lead trainees through the learning module, serving either as an assistant to a human instructor or as the primary instructor. Break-out sessions may be conducted using a tablet, allowing each student to follow checklists and showcase required competencies individually, with the virtual avatars of certain embodiments providing assessment and guidance. Additionally, the system can be extended to log training data directly to any learning management system (LMS), facilitating highly personalized training and assessment.

Once students are ready to move on to part-task trainers, the system can use the student data from the LMS to determine open requirements and pick task scenarios necessary for the student to complete. The virtual avatars may provide guidance and answer questions from the students, while the system monitors the actions of the students through computer vision and records and scores their performance.

When students are ready to be placed in a real-world environment with actual hardware, the system of certain embodiments may act as an assistant to the student by answering questions and providing relevant technical information via an overlay through a mixed-reality display device (e.g., Magic leap 2, holo lens 2, etc.). Using specially trained visual recognition modules to determine context, the technician is provided highlighting and spatial anchoring to aid in completing the procedure. According to certain embodiments, the highlighting may include drawing a brightly colored outline over or on top of a physical or virtual geometry to draw the eyes to that particular spot. According to some embodiments, the spatial anchoring may include tying elements of the virtual environment such as, for example, a call out arrow, or highlighting to physical or virtual geometry. The system can walk personnel through step-by-step procedures and provide guidance showing digital twins of the part(s) being worked on, the tooling required, additional documentation, graphs, and videos. Computer vision may monitor the work being performed against the standard and recognizes hazards, issues, and errors. In certain embodiments, the standard may be defined by the training being performed. For instance, in an example of changing a car tire, the parking brake should be applied, the vehicle should be lifted/jacked at the jack point, the tires should be unbolted, the tire should be replaced, the bolts should be tightened to a specific ft-lbs, and the car should be lowered once the tire has been replaced. If the user attempts to loosen the bolts before putting the parking brake on or if the user attempts to torque the bolts to the wrong torque value, the system may notice the discrepancies and report the issues or notify the user of a hazardous condition. As a result of the hazardous condition, the system may stop the training.

Border Screening

Certain example embodiments of the system may be applicable to any authority or terminal, cruise line terminals, and airport screening. The systems may also be used for entrance into venues such as concerts, casinos, sporting events, and other high-population events where screening of individuals is required. Certain embodiments may provide a labor-reducing aid for border control agencies. For example, the system may detect deceit, perform facial, voice, and fingerprint recognition, and connect to relevant databases. The system may act as a first-line filter in airports and other border and security control points. Individuals not yet screened approaching a kiosk equipped with a visual and infrared camera, document scanner, fingerprint scanner, scale, and other pertinent sensors, engage with the virtual avatars exactly like engaging with a human agent. A network of sensors may provide a stream of data points from the encounter. Example data points may include, but not limited to, for example, heart rate (determined using IR cameras), blink rate, estimated respiration rate, body weight, estimated height, facial expressions, eye gaze locations, fingerprints, type and weight of various elements of luggage, spoken language, agitation and stress in voice, and/or facial microexpression detection. This data may be analyzed to determine if further screening is required. Conversely, the system can be used to train border patrol agents on what to look for when screening. For instance, in certain embodiments, the virtual avatar may be used in the training process. For example, the virtual avatar may represent a person attempting to cross the border. The virtual avatar may also need to represent all of the important things border guards are trained to look for including, for example, deception, knowing their own information, and/or providing valid ID and answers to reasonable questions. In this example, the virtual avatar may also have the ability to perform facial microexpressions, use deceptive eye and body movements, as well as indicate stress in voices among other things.

Police/Military/First Responder or Other Law Enforcement Training

The system of certain embodiments may offer a versatile and effective tool for police/military training, allowing officers and soldiers to hone their skills in threat detection, crowd control, communication, and decision-making in a safe and controlled environment. This approach can contribute to better-prepared law enforcement and military personnel and, ultimately, enhance public safety. The system of certain embodiments may create realistic, simulated environments that mimic various scenarios police officers and soldiers may encounter in the field. This may include crowded spaces, urban landscapes, and various levels of threat situations. Officers and soldiers can then navigate through these simulations encountering avatars that need to be analyzed allowing them to practice and refine their skills in observing and analyzing human behavior. The avatars can simulate a variety of behavioral cues associated with potential criminal or terrorist activities, or to exhibit a range of threat indicators, such as nervous movements, erratic behavior, or carrying suspicious objects so officers learn to identify suspicious behaviors/threats and respond appropriately. The virtual avatars of certain embodiments can also be used to simulate large crowds and challenging crowd control situations allowing the practice of managing crowds, identifying instigators, and de-escalating tense situations. Unlike traditional video-based training systems, the virtual avatars and scenarios of certain embodiments can be changed quickly, adding and/or deleting context phrases that do not require hours of video capture and processing.

Cultural Sensitivity Training

Certain embodiments may be applicable to cultural sensitivity training that may include, for example the military, businesses, and/or travel. In certain embodiments, the system may be used to teach people traveling/deploying overseas how to recognize and understand verbal and non-verbal communication and cultural differences. Eventually, this may be productized and streamed over the cloud to anyone looking to gain an understanding of cultural differences. For instance, in certain embodiments, a character may be a built representative of each target culture, and the system may be built to recognize the salient traits of interaction with that culture. As an example, it may be that it is rude to sit before the host sits, or to not look while someone important is talking. In these examples, the system may notice these things and provide feedback. In some embodiments, certain linguistic cases and forms may be used when addressing people, and the system may also look for those linguistic cases.

Linguistics

Certain embodiments may be applicable to multilingual language training and/or interpreters. For instance, the system may be used in conjunction with a new or existing language learning models such as, for example, Babble or Rosetta Stone. Another way the system could be used could be as an actual interpreter for meetings, depositions, court hearings, etc. In other embodiments, use of the avatar may be optional. In further embodiments, the system may provide simultaneous translation using the system's speech recognition and a language translation model to power a speech output. According to certain embodiments, the system may be applicable in police or military training to work with an interpreter. For instance, in some environment, a virtual avatar may perform the role of an interpreter either for a virtual avatar or a real human interacting with the trainee. The speech and body language of the target speaker may be interpreted by the virtual avatar and relayed to the trainee. After receiving the interpretation, trainee speech may similarly be relayed by the virtual translator to the target speaker.

Training Aid

In certain embodiments, the system may be applicable to interviewing, defending a thesis, asking for a rise, etc. For instance, the system may be used to prepare a speaker for a high stress interactive speaking engagement. In each case, the system may be provided with information about the situation of the user, in the example of thesis defense, a copy of the thesis could be analyzed. This analysis would generate data that may be used to ask the user pointed questions to attempt to exercise their knowledge of the relevant subject.

Education

In certain embodiments, the system may be applicable to classroom environments, career training programs, museums, or anywhere that needs introductions (e.g., environments where questions are usually asked). For instance in certain embodiments, the system may be used to assist students in a classroom, home school, or blended hybrid educational environment by providing a fully interactive tutor (e.g., virtual avatar) who can leverage knowledge of the educational curriculum and the current progress of the student to provide feedback and synthesize exercises. Students would interact with the system through speech or using a computer or mobile device to request explanations of concepts, provide critiques on techniques, and perform the other functions usually performed by an instructor.

Entertainment

In certain embodiments, the system may be applicable to the entertainment area. For instance, in some embodiments, the system may be used to provide visitors guidance and to enhance the overall visitor experience in places such as amusement parks, museums, casinos, historical sites, etc. Visitors can interact with the system (e.g., with the virtual avatar) to ask questions, learn about the place/history/exhibits, etc. According to certain embodiments, the system may display videos, maps, and other digital information. According to other embodiments, the system may also be used to extend virtual or extended reality games, and for e-Sport analysis. For example, in a theme park greeter scenario, there may be a virtual reality video game where one does not know what to do or how to move. The system in this example scenario may act as a tutor or virtual character in the game to enhance the user experience.

Business and E-Commerce

In certain embodiments, the system may be applicable to business and e-commerce. For instance, in certain embodiments, the system may be used in retail locations to help shoppers find items they are looking for and to navigate large stores, answer questions about brands, return policies, etc. Much like your own personal shopper. Through the use of computer vision, body scans could be run and specific clothing could be suggested based on style and fit. In other embodiments, the system may also be used in e-commerce much in the same way where a virtual avatar is displayed and instead of typing questions or using a search function, the consumer can interact with the avatar in the same ways that they can interact with a human in the store.

Military Training

In certain embodiments, the system may be applicable in military training. For instance, in some embodiments, the system may be used to train coast guard and maritime sailors in the proper use of the maritime radio system. Coast Guard training could also include responding to synthetic distress calls and providing assistance to simulated mariners over the radio. Additionally, the trainee may be presented with an avatar of a rescued person to interview after a virtual rescue operation.

Medical and Dental Services

In certain embodiments, the system may be applicable in medical and dental services. For instance, in some embodiments, the system may be used to provide triage services in the office or for telehealth. For instance, in some embodiments, the system may be used for training and to act as an intake agent. For training, a training model of characters may be created, and a nurse or medical personnel may train with the created characters via interactions to establish proper triage care. For intake, an expert model may be created or leveraged based on the specific practice. Additionally, a standard questionnaire (e.g., as is typically used in hospitals, etc.) may be programmed into the virtual avatar system. Patients may interact with the virtual avatar which may ask the needed questions based on the supplied standard questionnaire and expert model, and perform the required electronic charting. The expert model may then be used to determine the outcome of the triage and the patient may be relayed for further care.

Health and Nutrition, and Smart Appliances

In certain embodiments, the system may be applicable in health and nutrition, and smart appliances. For instance, in some embodiments, the system may be used to recognize contents inside a pantry and refrigerator, analyze the contents against a person's health goals, and provide recommendations for meals along with cooking instructions. In some embodiments, the system may not necessarily need to use an avatar. Instead, avatars may be an extension of the system, but not required. The system may operate as a voice only agent or as an agent that can highlight objections in the environment, and be talked to and talk. Alternatively, the system may operate as a fully immersive 3D avatar. In other embodiments, the avatar may be a 2D cartoon character on a TV or website, etc.

Robotics

In certain embodiments, the system may be appliable in robotics. For instance, in some embodiments, the system may be integrated with robotics and robotic technologies. For example, in some embodiments, the system may be used in robotics to learn and improve interpersonal skills enabling the robot to operate autonomously or semi-autonomously based on the learned and improved skills. In certain embodiments, the system may provide a way for robots to work alongside humans in a cooperative environment, and the system may enable humans to provide voice feedback to the robots for use in training the robots at a later time . . .

Figure 7:
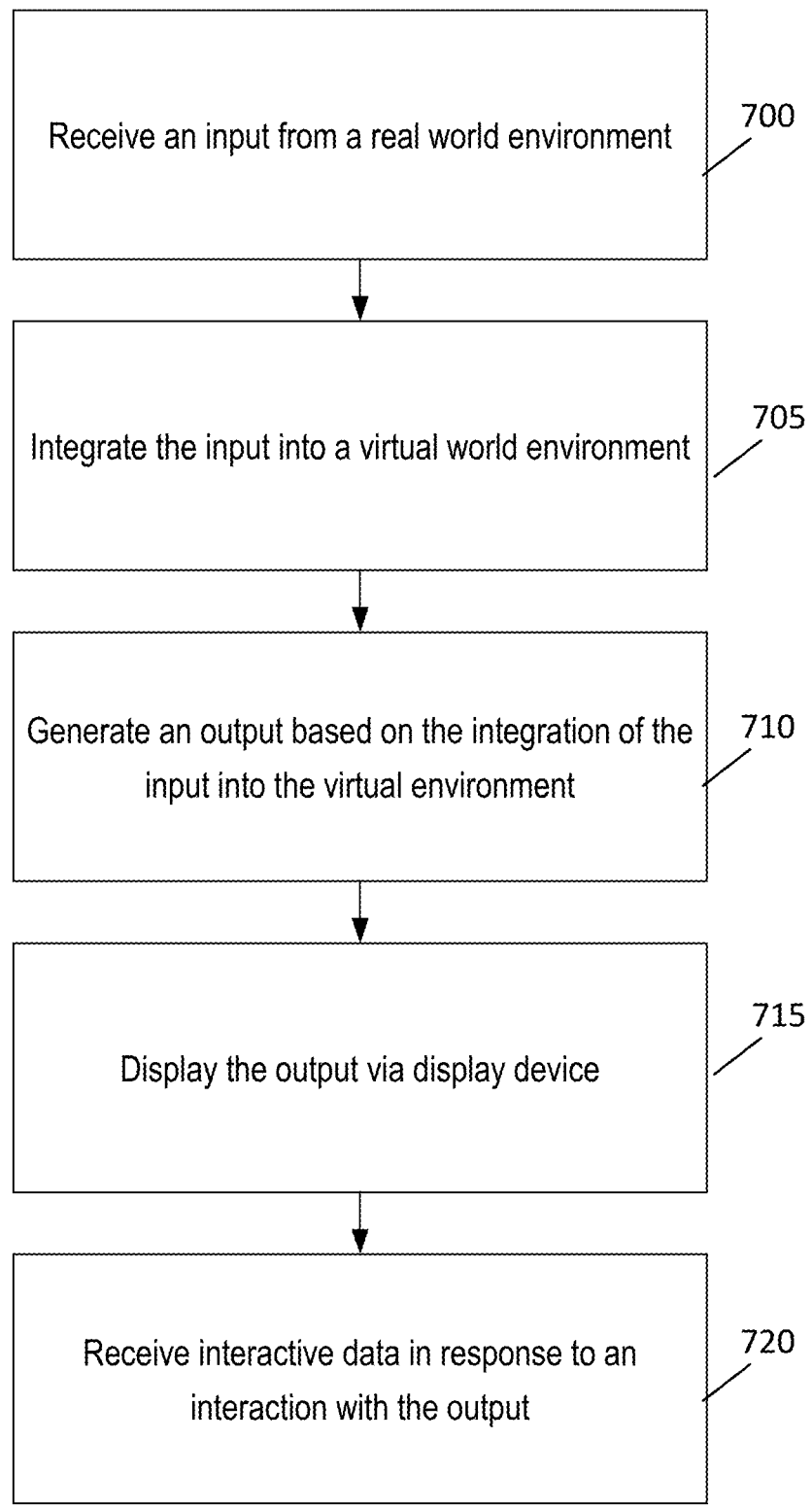
FIG. 7 an example flow diagram of a method, according to certain embodiments.

FIG. 7 illustrates an example flow diagram of an operation of the snap-on device, according to certain example embodiments. In certain embodiments, the method of FIG. 7 may be performed by an apparatus and/or system similar to the apparatus 10 illustrated in FIG. 8.

As illustrated FIG. 7, at 700, the method may include receiving an input from a real world environment. The method may also include, at 705, integrating the input into a virtual world environment. The method may further include, at 710, generating an output based on the integration of the input into the virtual environment. According to certain embodiments, the output may include data or discrete events that represent information about the real world environment or the virtual world environment. In addition, the method may include, at 715, displaying the output via display device. Further, the method may include, at 720, receiving interactive data in response to an interaction with the output.

According to certain embodiments, the output may include at least one of a virtual avatar capable of receiving input from one or a plurality of sources, text or speech, a presence or an orientation of an object in in the real world environment, information identifying attributes of an object in the real world environment, an augmented reality that brings the virtual world environment into the real world environment, or a three-dimensional visualization of the real world environment. According to some embodiments, the method may also include implementing machine learning with a machine learning library to generate a facial animation from pre-recorded audio or synthetic audio. According to other embodiments, the method may further include controlling the output to interact with physical spaced in the real world environment.

In certain embodiments, the method may also include detecting and recognize an object and attributes of the object in space of the real world environment. In some embodiments, the attributes of the object comprise at least one of a distance of the object from a reference point, a posture of the object, or a specific part of the object and a location of the part of the object. In other embodiments, the method may further include performing segmented dimming of the output by utilizing an occlusive layer in the display device to block light from the virtual world environment displaying opaque virtual entities. In further embodiments, the method may also include replicating a rhythm, an intonation, and a cadence of the input.

Figure 8:
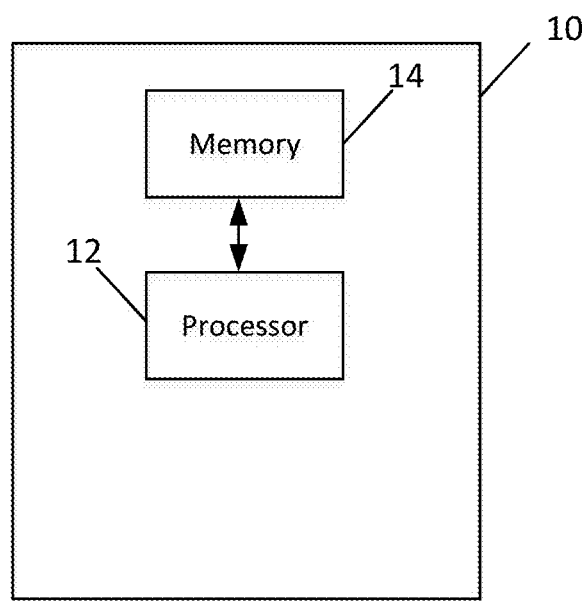
FIG. 8 illustrates an apparatus according to certain example embodiments.

Certain embodiments may be implemented in an apparatus and/or system. For instance, FIG. 8 illustrates an apparatus 10 according to certain example embodiments. In certain example embodiments, apparatus 10 may be a computer, mobile computing device, network device, server, or other similar device. Apparatus 10 may be in communication (i.e., connected to either via wire or wirelessly) with other similar computer devices (e.g., snap-on device and/or wearable device) forming a network of connected computer devices.

In some example embodiments, apparatus 10 may include one or more processors, one or more computer-readable storage medium (for example, memory, storage, or the like), one or more radio access components (for example, a modem, a transceiver, or the like), and/or a user interface.

As illustrated in the example of FIG. 12 apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain embodiments, the multiprocessor system may be tightly coupled or loosely coupled (e.g., to form a computer cluster). The processor may perform functions associated with the operation fo the apparatus and/or system.

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to certain example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of a hardware circuit or processor (or multiple processors), or portion of a hardware circuit or processor, and its accompanying software and/or firmware.

In certain example embodiments, apparatus 10 may be controlled by memory 14 and processor 12 to receive an input from a real world environment. Apparatus 10 may also be controlled by memory 14 and processor 12 to integrate the input into a virtual world environment. Apparatus 10 may further be controlled by memory 14 and processor 12 to generate an output based on the integration of the input into the virtual environment. According to certain embodiments, the output may include data or discrete events that represent information about the real world environment or the virtual world environment. Apparatus 10 may also be controlled by memory 14 and processor 12 to display the output via display device. Further, apparatus 10 may be controlled by memory 14 and processor 12 to receive interactive data in response to an interaction with the output.

In some example embodiments, an apparatus (e.g., apparatus 10) may include means for performing a method, a process, or any of the variants discussed herein. Examples of the means may include one or more processors, memory, controllers, transmitters, receivers, sensors, and/or computer program code for causing the performance of the operations.

Certain example embodiments may further be directed to an apparatus that includes means for performing any of the methods described herein including, for example, means for receiving an input from a real world environment. The apparatus may also include means for integrating the input into a virtual world environment. The apparatus may further include means for generating an output based on the integration of the input into the virtual environment. According to certain embodiments, the output may include data or discrete events that represent information about the real world environment or the virtual world environment. In addition, the apparatus may include means for displaying the output via display device. Further, the apparatus may include means for receiving interactive data in response to an interaction with the output.

Certain example embodiments described herein provide several technical improvements, enhancements, and/or advantages. In some example embodiments, it may be possible to provide virtual avatars that may provide substantial and impactful benefits in a variety of industries. In other embodiments, the system may provide improvements in cost efficiency, increased efficiency and productivity, risk mitigation, scalability, consistency in interactions, data analysis and pattern recognition, language and cultural adaptability, customization and personalization, and tailored experiences.

According to certain embodiments, cost efficiency may be attained through reduced labor costs, virtual avatars can operate around the clock offering continuous service without the limitations imposed by human working hours, leading to significant cost savings. The behavior engine and intuitive interface of certain embodiments allows end users to customize scenarios, interactions, avatars and language quickly.

According to other embodiments, the system may achieve increased efficiency and productivity where virtual avatars process information and perform repetitive tasks consistently and without fatigue, leading to increased efficiency in tasks that require precision and repeatability.

In certain embodiments, the system may provide risk mitigation by monitoring hazardous environments or situations where human safety is at risk by reducing the potential for inquiries or accidents. In other embodiments, the system may provide scalability by easily scaling to handle increased workloads or demand without the need for additional human resources, and providing flexibility in managing varying levels of demand.

According to certain embodiments, the system may provide consistency in interactions by ensuring consistent communication and adherence to protocols, and reducing the likelihood of errors or miscommunications in certain scenarios. According to other embodiments, the system may provide data analysis and pattern recognition by being equipped with advanced AI, where the virtual avatars may analyze vast amounts of data, identify patterns, and derive insights quickly and comprehensively.

In certain embodiments, the system may provide language and cultural adaptability by being programmed to interact seamlessly in multiple languages and adapt to various cultural nuances, their versatility is enhanced in global applications. In other embodiments, the system may provide customization and personalization. For example, certain embodiments may provide speech synthesis systems that can be tuned to recreate the voice of real people using a sample of their speech. The combination of customized speech synthesis with motion capture allows the recreation of real world humans in a virtual environment. This can allow a virtual avatar to be created of a real person that closely approximates their looks, sounds, and body language and allows them to be used in the system.

According to certain embodiments, the system may provide tailored experiences. For example, the virtual avatars may be customized to provide personalized experiences, such as in customer service applications, by learning and adapting to individual preferences over time.

With various embodiments described herein, it may be possible to provide a digital avatar system that represents a significant leap in virtual interaction technologies, offering unparalleled realism, interactivity, and intelligence. With advanced AI technologies, the system may provide transformative experiences across various industries. As technology evolves, the system may have the capability to usher in a new era of human-computer interaction, in which interactions of digital avatars with humans are imperceptible from an interaction between two or more humans.

As described herein, a computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of code may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

I claim:

1. An apparatus, comprising:
   at least one processor; and
   at least one memory including computer program code which, when executed by the at least one processor, cause the apparatus to at least:
   receive an input from a real world environment;
   integrate the input into a virtual world environment;
   generate an output based on the integration of the input into the virtual environment, wherein the output comprises data or discrete events that represent information about the real world environment or the virtual world environment;
   display the output via a display device;
   receive interactive data in response to an interaction with the output; and
   control the output to interact with physical space in the real world environment, wherein the output comprises
      a virtual avatar capable of receiving input from one or a plurality of sources, or
      a three-dimensional visualization of the real world environment.

2. The apparatus according to claim 1, wherein the computer program code, when executed by the at least one processor, further causes the apparatus to at least:
   implement machine learning with a machine learning library to generate a facial animation from pre-recorded audio or synthetic audio.

3. The apparatus according to claim 1, wherein the computer program code, when executed by the at least one processor, further causes the apparatus to at least:
   detect and recognize an object and attributes of the object in space of the real world environment.

4. The apparatus according to claim 3, wherein the attributes of the object comprise at least one of the following:
   a distance of the object from a reference point,
   a posture of the object, or
   a specific part of the object and a location of the part of the object.

5. The apparatus according to claim 1, wherein the computer program code, when executed by the at least one processor, further causes the apparatus to at least:
   perform segmented dimming of the output by utilizing an occlusive layer in the display device to block light from the virtual world environment displaying opaque virtual entities.

6. The apparatus according to claim 1, wherein the computer program code, when executed by the at least one processor, further causes the apparatus to at least:
   replicate a rhythm, an intonation, and a cadence of the input.

7. A method, comprising:
   receiving an input from a real world environment;
   integrating the input into a virtual world environment;
   generating an output based on the integration of the input into the virtual environment, wherein the output comprises data or discrete events that represent information about the real world environment or the virtual world environment;
   displaying the output via a display device;
   receiving interactive data in response to an interaction with the output; and
   controlling the output to interact with physical space in the real world environment,
   wherein the output comprises
      a virtual avatar capable of receiving input from one or a plurality of sources, or
      a three-dimensional visualization of the real world environment.

8. The method according to claim 7, further comprising:
   implementing machine learning with a machine learning library to generate a facial animation from pre-recorded audio or synthetic audio.

9. The method according to claim 7, further comprising:
   detecting and recognize an object and attributes of the object in space of the real world environment.

10. The method according to claim 9, wherein the attributes of the object comprise at least one of the following:
    a distance of the object from a reference point,
    a posture of the object, or
    a specific part of the object and a location of the part of the object.

11. The method according to claim 7, further comprising:
    performing segmented dimming of the output by utilizing an occlusive layer in the display device to block light from the virtual world environment displaying opaque virtual entities.

12. The method according to claim 7, further comprising:
    replicating a rhythm, an intonation, and a cadence of the input.

13. A non-transitory computer readable medium encoded with instructions that, when executed in hardware, performs a process, the process comprising:
    receiving an input from a real world environment;
    integrating the input into a virtual world environment;
    generating an output based on the integration of the input into the virtual environment, wherein the output comprises data or discrete events that represent information about the real world environment or the virtual world environment;
    displaying the output via a display device; receiving interactive data in response to an interaction with the output; and
    controlling the output to interact with physical space in the real world environment,
    wherein the output comprises
       a virtual avatar capable of receiving input from one or a plurality of sources, or
       a three-dimensional visualization of the real world environment.

14. The non-transitory computer readable medium according to claim 13, wherein the process further comprises:
    implementing machine learning with a machine learning library to generate a facial animation from pre-recorded audio or synthetic audio.

15. The non-transitory computer readable medium according to claim 13, wherein the process further comprises:
    detecting and recognize an object and attributes of the object in space of the real world environment.

16. The non-transitory computer readable medium according to claim 15, wherein the attributes of the object comprise at least one of the following:
    a distance of the object from a reference point,
    a posture of the object, or
    a specific part of the object and a location of the part of the object.

17. The non-transitory computer readable medium according to claim 13, wherein the process further comprises:
 performing segmented dimming of the output by utilizing an occlusive layer in the display device to block light from the virtual world environment displaying opaque virtual entities.

18. The non-transitory computer readable medium according to claim 13, wherein the process further comprises:
 replicating a rhythm, an intonation, and a cadence of the input.

\* \* \* \* \*